Jan. 7, 1969 YOSHICHIKA SAKAMOTO 3,419,984
SLIDE VIEWER
Filed Nov. 28, 1966 Sheet 5 of 5
Fig. 9
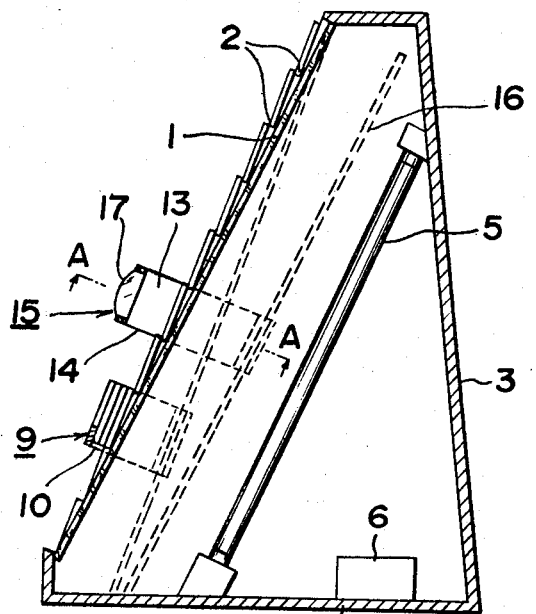
Fig. 10
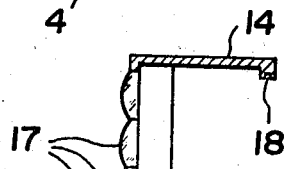
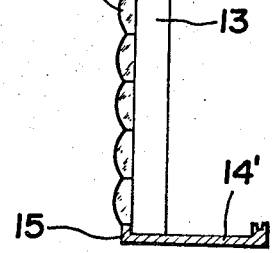
INVENTOR
YOSHICHIKA SAKAMOTO
BY Young + Thompson
ATTORNEYS

# United States Patent Office 3,419,984
Patented Jan. 7, 1969

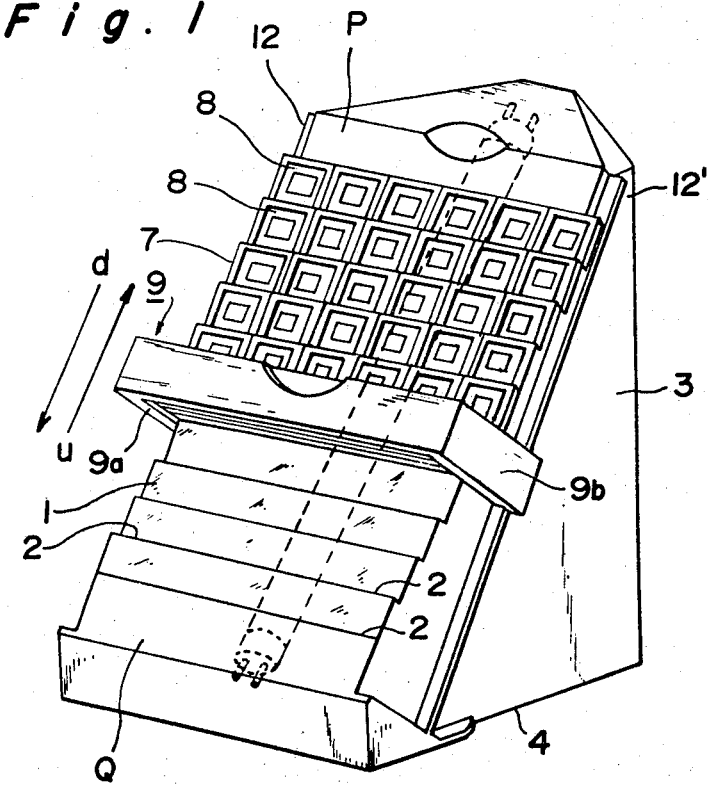
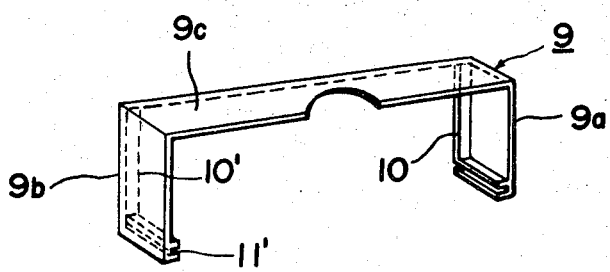

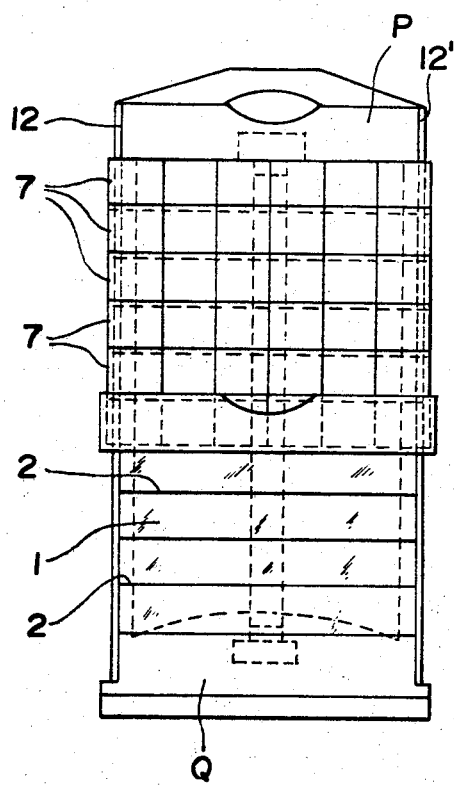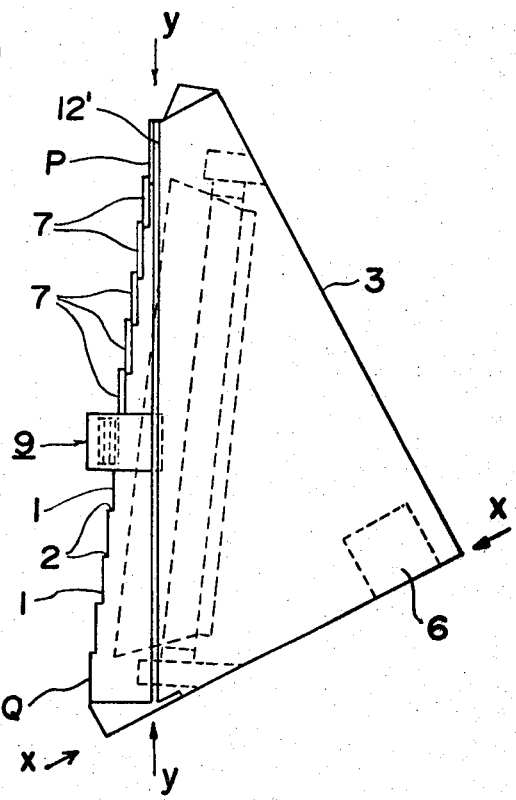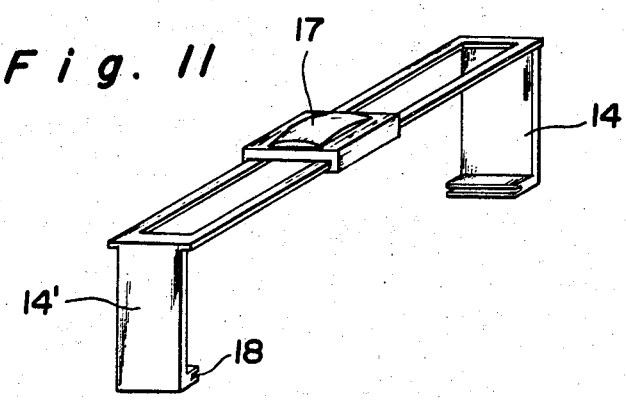

3,419,984
SLIDE VIEWER
Yoshichika Sakamoto, 214 2-chome, Sengen-cho,
Ohmiya, Japan
Filed Nov. 28, 1966, Ser. No. 597,405
Claims priority, application Japan, Dec. 24, 1965,
40/79,265; Sept. 22, 1966, 41/88,615
U.S. Cl. 40—106.1     7 Claims
Int. Cl. G09f 13/10

ABSTRACT OF THE DISCLOSURE

A slide viewer for inspecting slides that are retained in holding frames and distributed over a translucent front plate which has steps for the holding frames. The holding frames are dispensed from and collected in a chamber which slides in a direction perpendicular to the translucent front plate, so that as the chamber is lowered the holding frames are stripped sequentially from the chamber and placed on the steps and when the chamber is raised the holding frames are sequentially removed from the steps and stacked in the chamber.

---

This invention relates to a slide viewer, more particularly a novel slide viewer for inspecting simultaneously a great number of photographic slides in the state as held by a plurality of slide holding frames to hold several slides in a row.

There has been used a long rectangular slide holding frame to hold a plurality of photographic slides in a row which is very convenient for projecting the slides held therein by using a projector adapted to cooperate with such slide holding frames. Besides, such slide holding frames are easy to store by using boxes to receive several such frames in a very compact manner. However, it has been difficult to inspect a number of slides held by a plurality of such slide holding frames.

According to the present invention, such difficulty of the conventional slide holding frame is obviated by providing a slide viewer for inspecting simultaneously a great number of slides in the state as held by a plurality of slide holding frames to hold several slides in a row, comprising a box having a translucent front plate inclined away from the vertical direction by a small angle, a plurality of step means to hold one said slide holding frame on each said step means in such a manner that each slide held by said slide holding frame is kept opposite to said translucent front plate substantially in parallel therewith, each said step means having height not exceeding the thickness of said slide holding frame, a light source means placed within said box, a pair of guide rails secured substantially on both sides of the translucent front plate, a slidable bridge member extending horizontally across said front plate and having a pair of leg means including a pair of guide grooves to engage slidably with said pair of guide rails, a chamber formed in said bridge member to retain a stack of said slide holding frames piled in the direction perpendicular to said front plate so as to keep each slide held therein substantially in parallel with said translucent front plate, and a pair of stopper means formed on said leg means, thereby as said bridge member retaining said slide holding frames moves downwards from the upper end of said front plate, said slide holding frames are distributed over the entire span of said translucent front plate by placing said slide holding frames on said step means, while as said bridge means moves upwards, each said slide holding frame thus distributed is collected and stacked in said chamber of said bridge member by the engagement between the slide holding frames and said stopper means.

Therefore, an object of the invention is to improve the efficiency and effectiveness of inspection and appreciation of photographic slides by spreading simultaneously a great number of slides held by a plurality of the aforementioned slide holding frames on an illuminated translucent plate in a simple and speedy manner. Thereby, the slides to be projected can be easily selected and the sequential order in which such slides are to be projected can be modified in harmony with the oral explanation to be made in conjunction with the slide projection. According to the viewer of the invention, the slides thus spread on the viewer can be readily collected for mounting them quickly on the projector for projection or for quick storing by placing them in storage boxes.

For a better understanding of the invention, reference is made to the accompanying drawings, in which;

FIG. 1 is a perspective view of a slide viewer embodying the present invention;

FIG. 2 is a perspective view of a slidable bridge member to be used in the slide viewer, illustrating the inner structure thereof;

FIG. 3 is a side elevation of the slide viewer of FIG. 1, wherein the line y—y shows the direction in which the bridge member moves and the line x—x shows that portion of the viewer which should be held horizontally;

FIG. 4 is an elevation of the slide viewer taken at the right angles to the line y—y;

FIGS. 8 and 9 are a front view and a vertical sectional view respectively of a slide viewer according to the present invention, in which an additional bridge member having a plurality of magnifying lens means is incorporated;

FIG. 10 is a sectional view of the slidable bridge member having a plurality of magnifying lens means, usable in conjunction with the slide viewer shown in FIGS. 8 and 9; and FIG. 11 is a view similar to FIG. 10, illustrating a bridge member having a single horizontally slidable lens means.

Throughout the drawings, the same parts and portions thereof are referred to by the same reference numerals.

Figure 5:
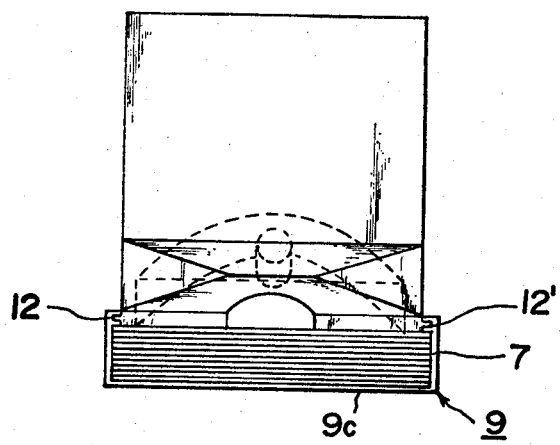
FIG. 5 is a plan view of the slide viewer projected in the direction of the line y—y.

Referring to FIGS. 1 to 6, a generally rectangular translucent plate 1, preferably a milky white plate, is secured to a box 3 with a slight rearward inclination to facilitate viewing of slides placed thereon by an inspector. In this particular embodiment, a plurality of steps 2 are formed on the translucent plate 1 so as to extend horizontally from one edge to the opposite edge of the plate to receive one slide holding frame 7 per step. The height of each step is somewhat smaller than the thickness of a slide holding frame 7 having a plurality of slides 8 disposed in a row. For instance, each such slide holding frame can hold up to six slides in a row and the viewer is adapted to receive up to ten such slide holding frames 7, as shown in FIG. 1. However, the number of slides in a slide holding frame and the number of slide holding frames to be received by the viewer are not restricted to six and ten respectively. An opaque plate P is placed flush with the uppermost portion of the translucent plate 1 and extended along the upper edge of the translucent plate 1. Another opaque plate Q is placed along the lower edge of the translucent plate 1 at a level higher than the lowermost portion of the translucent plate 1 by the height corresponding to that of a step 2, as best shown in FIG. 3.

A light source means, is mounted within the box 3 together with fixtures of the light source means such as a fluorescent light 5 positioned underneath the translucent plate 1 along the longitudinal centerline thereof. An electrical power source means 6, such as a chalk coil of the fluorescent lamp 5, is secured to the bottom plate 4 of the box 3. The weight of the power source means 6 can be used advantageously for providing a high mechanical stability to the slide viewer.

A generally channel shaped bridge member 9 extends horizontally across the translucent plate 1 in a vertically slidable manner. The leg means 9a and 9b at both ends of the bridge member 9 have a pair of grooves 11' formed at the lower end portions thereof, as shown in FIG. 2. The grooves 11' respectively engage guide rails 12 and 12' secured to the box 3 substantially along both sides of the translucent plate 1 to facilitate the vertical reciprocative movement of the bridge member 9 in parallel with the translucent plate 1.

There are provided a pair of stopper means 10 and 10' secured to the lower side edges of the leg means 9a and 9b respectivley, as shown in FIG. 2. A stack of the slide holding frames 7, for instance a stack comprising up to ten frames in this particular embodiment, can be inserted into a chamber in the bridge member 9 defined by the traverse plate 9c of the bridge member, leg means 9a and 9b thereof, and the stoppers 10 and 10' secured thereto. The angular relation between the translucent front plate 1 and the guide rails 12, 12' is such that when the bridge member 9 is located adjacent to the opaque plate P at the uppermost portion of the translucent plate 1, the distance between the traverse plate 9c and the opaque plate P is the same as the height of that stack of slide holding frames 7 which includes maximum allowable number of the frames of the slide viewer, say ten frames in this particular embodiment, while when the bridge member 9 comes to the position of the other opaque plate Q, the traverse plate 9c may be brought into direct contact with the opaque plate Q.

Figure 6:
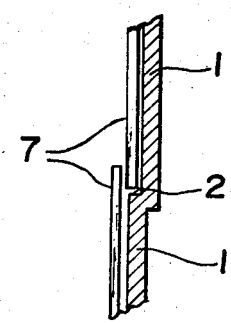
FIG. 6 is an enlarged sectional fragmentary view illustrating construction of step means of the slide viewer.

Accordingly, if a stack of slide holding frames, say ten frames, are inserted into the chamber of the bridge member 9 when the bridge member is at the position of the opaque plate P, then as the bridge member 9 is moved downwards to the other opaque plate Q in a direction shown by an arrow d of FIG. 1, the stack of the slide holding frames are distributed over the entire span of the translucent plate 1 by placing one slide holding frame per each step 2. As long as the light source means 5 is energized, the pictures of the entire slides thus distributed can be viewed at a time. It is preferable to use such distance between adjacent steps that a slide held by one step may be partially overlapped with another slide held by the step adjacent to said one step, as shown in FIG. 6.

On the other hand, as the bridge member 9 thus brought down to the opaque plate Q is moved upwards to the upper opaque plate P in the direction shown by an arrow u of FIG. 1, the slide holding frames 7 distributed over the translucent plate 1 are collected and stacked in the chamber of the bridge member 9.

Figure 7:
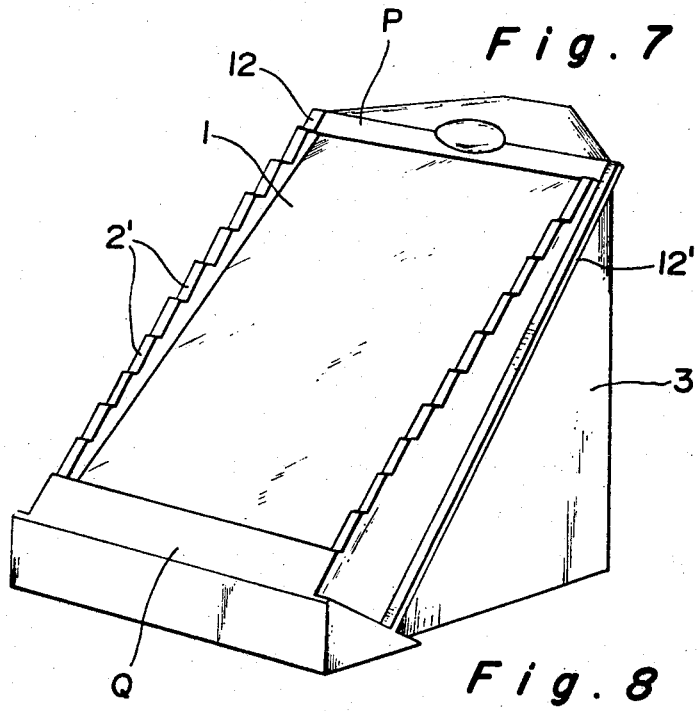
FIG. 7 is a perspective view of another embodiment of the invention.

FIG. 7 shows another embodiment of the invention, wherein a flat translucent plate 1 is used instead of a step-like bent translucent plate of the preceding embodiment. The step means of the viewer of FIG. 7 comprises a plurality pairs of steps comprising a first series of steps formed on one side of the translucent front plate and a second cooperating series of steps formed on the opposite side of the front plate, and the height of each said pair of steps is not greater than the thickness of said slide holding frame. Thus, the translucent front plate of this embodiment is completely separated from the step means.

Figure 8:
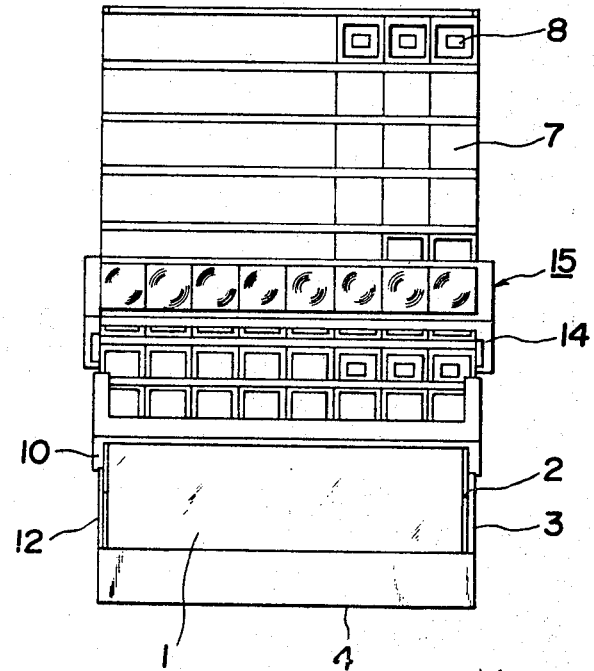

FIGS. 8 and 9 illustrate a slide viewer according to the present invention, in which a second bridge member including a plurality of magnifying lens means is slidably mounted on the side walls of a box thereof, and FIG. 9 illustrates the second bridge member in section. The general construction of this slide viewer is essentially the same as that of the preceding viewer shown in FIG. 7, except the addition of the second bridge member 15 having a considerably larger span than that of a slide displaying bridge member 9 thereof.

In other words, the legs 14 and 14' of the second bridge member 15 is so spaced that the hollow space 13 defined within the second bridge member 15 is large enough to allow free passage of the slide displaying bridge 9 therethrough. As shown in the drawings, the second bridge member 15 is adapted to slide along a pair of second guide rails 16 secured to the side walls of a box 3 of the viewer in parallel with a translucent plate 1 thereof. For effecting such sliding movement of the bridge member 15, a groove 18 is formed on each leg 14 or 14' thereof in such a manner that said groove 18 may be brought into slidable and complementary engagement with the guide rail 16.

A plurality of magnifying lens means 17 are mounted on the second bridge member 15, so that each said magnifying lens means may be positioned opposite to a slide 8 placed on the translucent front plate 1 to produce a magnified image thereof whenever said bridge member 15 is properly positionsed along said guide rails 16 and 16'. Instead of said plurality of lens means 17, it is permissible to mount a single horizontally slidable lens means (FIG. 11) on the bridge 15 in a manner similar to that of a well-known cursor line glass of a slide rule, so that each slide disposed on the translucent plate 1 may be selectively viewed through the magnifying lens means by moving said lens means horizontally on the bridge member 15 vertically slidable along the guide rails 16 and 16'.

Thus, one can make exact and magnified inspection of each slide with ease through the magnifying lens means mounted on the second bridge member 15.

It is preferable to provide a suitable click action device, such as frictional or elastic click device, between the bridge member 15 and the guide rails 16 in order to hold the bridge member 15 and magnifying lens means 17 thereof in proper relation with each row of the slides disposed horizontally on the translucent plate 1. It is permissible to space the lens means 17 from the slide 8 by a certain constant distance, say a distance equivalent to the focal length of the lens means.

As described in the foregoing, according to the invention, a stack of slide holding frames having several slides in a row can be distributed in front of an illuminated translucent plate for simultaneous inspection responsive to downward movement of a bridge member, while the slide holding frame thus distributed can be collected and stacked within said bridge member responsive to the upward movement of said bridge member. The process of inspection, appreciation, and editorship of a great number of slides is thus simplified to a considerable extent.

What I claim is:

1. A slide viewer for inspecting simultaneously a number of slides held by a plurality of slide holding frames to hold several slides in a row, comprising a box having a translucent front plate inclined away from the vertical direction by a small angle, a plurality of step means to hold said slide holding frames one on each of said step means in such a manner that each of said slides held by said slide holding frames is kept opposite to said translucent plate substantially in parallel therewith, each said step means having a height not exceeding the thickness of said slide holding frames, a light source means placed within said box, a pair of guide rails secured substantially on both sides of the translucent front plate, a slidable bridge member extending horizontally across said front plate and having a pair of leg means including a part of guide grooves to engage slidably with said pair of guide rails, a chamber formed in said bridge member to retain a stack of said slide holding frames piled in the direction perpendicular to said front plate so as to keep each slide held therein substantially in parallel with said translucent front plate, and a pair of stopper means formed on said leg means, thereby as said bridge member retaining said slide holding frames moves downwards from the upper end of said front plate, said slide holding frames are distributed over the entire span of said translucent front plate by placing said slide holding frames on said step means, while as said bridge means moves upwards, each of said slide holding frames thus distributed is collected and stacked in said chamber of said bridge member by the engagement between the slide holding frames and said stopper means.

2. A slide viewer according to claim 1, wherein said translucent front plate is so bent as to form said plurality of step means extending horizontally across said translucent front plate.

3. A slide viewer according to claim 1, wherein said plurality of step means consist of a plurality of pairs of steps including a first series of steps formed on one side of said translucent front plate and a second series of steps formed on the opposite side of said translucent front plate so as to cooperate with said first series of steps.

4. A slide viewer according to claim 1 and further comprising a second slidable bridge member having at least a magnifying lens means mounted thereon, wherein said magnifying lens means can be moved opposite to any one of the slides disposed on said translucent front plate so as to provide an enlarged image thereof.

5. A slide viewer according to claim 4, wherein said slidable second bridge member is provided a plurality of magnifying lens means affixed thereon.

6. A slide viewer according to claim 4, wherein said slidable second bridge member is provided with a single magnifying lens means slidably mounted thereon.

7. A slide viewer according to claim 4, wherein said second slidable bridge member is adapted to move in parallel with the translucent front plate and provided with a hollow chamber formed therein, said hollow chamber being large enough to allow free passage of said slidable bridge member to distribute slide holding frames.

References Cited

UNITED STATES PATENTS 1,347,179    7/1920    Schnitzspahn          138—8
3,217,436    11/1965    Van Wormer       40—106.1

EUGENE R. CAPOZIO, *Primary Examiner.*

R. CARTER, *Assistant Examiner.*

U.S. Cl. X.R.

40—124; 133—8; 214—7, 8; 312—50